(12) United States Patent
Mercier

(10) Patent No.: US 9,803,613 B2
(45) Date of Patent: Oct. 31, 2017

(54) MOUNTING IN HUB FOR BLADES OF A HYDRO TURBINE

(71) Applicant: ANDRITZ HYDRO CANADA INC., Pointe-Claire (CA)

(72) Inventor: Yves Mercier, Blainville (CA)

(73) Assignee: ANDRITZ HYDRO CANADA INC., Pointe-Claire (CA)

( * ) Notice: Subject to any disclaimer, the term of this patent is extended or adjusted under 35 U.S.C. 154(b) by 585 days.

(21) Appl. No.: 14/377,719

(22) PCT Filed: Feb. 6, 2013

(86) PCT No.: PCT/CA2013/000102
§ 371 (c)(1),
(2) Date: Aug. 8, 2014

(87) PCT Pub. No.: WO2013/116927
PCT Pub. Date: Aug. 15, 2013

(65) Prior Publication Data
US 2015/0017004 A1    Jan. 15, 2015

Related U.S. Application Data

(60) Provisional application No. 61/596,872, filed on Feb. 9, 2012.

(51) Int. Cl.
*F03B 3/12* (2006.01)
*F03B 3/02* (2006.01)
*F03B 3/16* (2006.01)

(52) U.S. Cl.
CPC ............... *F03B 3/128* (2013.01); *F03B 3/02* (2013.01); *F03B 3/126* (2013.01); *F03B 3/16* (2013.01);
(Continued)

(58) Field of Classification Search
CPC .......... F03B 3/128; F03B 3/126; F03B 3/121; F03B 3/02
(Continued)

(56) References Cited

U.S. PATENT DOCUMENTS 6,926,494 B2 *  8/2005  Sabourin .................. F03B 3/04
                                                     29/889.1
8,235,669 B2 *  8/2012  Des Roches ............ F03B 3/126
                                                     416/219 R
(Continued)

FOREIGN PATENT DOCUMENTS

CA    2605807 A1    4/2009
CA    2605817 A1    4/2009
(Continued)

OTHER PUBLICATIONS

Toshiba Corporation Power Systems and Services Company, "Hydraulic Turbines" brochure, No. 6316-5, 00-07T1, 40 pages, pre-Feb. 2012.
(Continued)

*Primary Examiner* — Gregory Anderson
*Assistant Examiner* — Juan G Flores
(74) *Attorney, Agent, or Firm* — Kerri Hochgesang; Robert Joseph Hornung

(57) ABSTRACT

A hydro turbine assembly includes a hub configured to rotate about a center axis and configured to be mounted in a water passage. The hub includes an upstream end, a downstream end and an outer surface between the upstream and downstream ends. The hub includes at least three mounting recesses arranged in the outer surface wherein each mounting recess includes a first hub mounting surface and a second hub mounting surface, and the second hub mounting surface is downstream and radially inward of the first hub mounting surface. The assembly includes at least three runner blades
(Continued)

each including a base configured to seat in a respective one of the mounting recesses, wherein the base includes a first blade mounting surface arranged to abut the first hub mounting surface and a second blade mounting surface arranged to abut the second hub mounting surface.

15 Claims, 14 Drawing Sheets

(52) U.S. Cl.
CPC ....... *Y02E 10/223* (2013.01); *Y10T 29/49321* (2015.01)

(58) Field of Classification Search
USPC .................................. 416/219 R, 204 R, 248
See application file for complete search history.

(56) References Cited

U.S. PATENT DOCUMENTS 8,419,369 B2  4/2013  Des Roches et al.
2009/0092495 A1  4/2009  Roches et al.
2009/0092496 A1*  4/2009  Roches ................... F03B 3/126
                                                              416/219 R
2012/0308397 A1  12/2012  Sabourin et al.

FOREIGN PATENT DOCUMENTS

| EP | 2 530 298 B1 | 12/2013 |
| GB | 196254 | 2/1924 |
| WO | 2004/030430 A1 | 4/2004 |
| WO | 2009/072892 A2 | 6/2009 |

OTHER PUBLICATIONS

E. L. Vakhnina, Official Action for Russian Patent Application No. 2014136466, dated Dec. 19, 2016, pp. 1-4, Patent Office of the Russian Federation, Moscow, Russia.

* cited by examiner

MOUNTING IN HUB FOR BLADES OF A HYDRO TURBINE

CROSS RELATED APPLICATION

This application is the U.S. national phase of International Application No. PCT/CA2013/000102 filed 6 Feb. 2013 which designated the U.S. and claims priority to U.S. Provisional Patent Application No. 61/596,872 filed 9 Feb. 2012, the entire contents these applications are incorporated by reference.

TECHNICAL FIELD

This invention relates generally to hydro turbines and in particular to coupling runner blades to a hub in a water (hydro) turbine. More particularly, the invention relates to the mounting surfaces at the base of a runner blade and the opposing mounting surfaces on the hub.

BACKGROUND

FIG. 1 illustrates a conventional axial water turbine 10 in an annular chamber 12 that may be embedded in the concrete of a water dam 13. An example of the axial turbine of the propeller blade type shown in FIG. 1, and particularly the mounting of the runner blades to the hub, is shown in U.S. Patent Application Publication 2009/0092496.

A water turbine is typically at an elevation well below the surface of the lake or other water source behind a dam. The annular chamber 12 defines a generally vertical axial water flow passage, as indicated by the arrow labeled H2O. Water flows through passages in the dam, through the annular chamber and over the runner blades. The blades and hub 16 rotate about a vertical axis. A shaft 24 extends between the hub and a generator. The force of the water rotates the runner blades, hub and shaft to drive the electric generator which produces electricity.

The hub 16 is tapered in the direction of water flow and may connect to a cone 18. The tapered surfaces of the hub and cone extend the hydraulic profile of the hub. Water flows smoothly over the hub and cone and down from the water turbine.

The more water flowing through the turbine, the greater the amount of power that can be delivered by the turbine to the generator. The amount of water flowing through the turbine is limited by the smallest cross-sectional area of the water passage in the turbine. This smallest cross-sectional area is typically the narrowest, e.g., the throat (T), portion of the annular water passage between the chamber 12 and hub 16. The throat is typically at the same elevation in the turbine as are the tips of the runner blades. The diameter of the throat (T) and the diameter (H) of the hub at the throat determine the smallest annular area of the water passage. The greater the ratio of the throat to the hub (T/H) the larger the water passage.

Runner blades are often made of stainless steel, which provides corrosion and cavitation resistance but is expensive. Where the hub is integrally cast with the runner blades, the hub is also formed of stainless steel. If the runner blades are not integrally formed with the hub, the hub may be formed of a less expensive material such as mild steel because the hub is less exposed to cavitation of the water than are the blades. Hubs formed of mild steel may be painted to provide corrosion resistance.

A common runner blade type is propeller-style blades bolted to a hub. This type of runner blade has a circular base 20 that bolts to a recessed circular mount 22 in the side of the hub, as is shown in FIG. 1. The bottom of the base has a mounting surface that is typically flat, circular and generally perpendicular to the axis of the runner blade.

FIG. 2 illustrates another conventional water turbine 26 having runner blades 28 fixed to a conical hub 30. Each runner blade 28 is integrally cast with a segment of the hub 30. The hub segments with the blades are arranged in an annular array and held together by shrink rings 32.

Water flows radially inward to the water turbine 26 and is discharged axially downward. The turbine 26 is a diagonal propeller blade turbine because the water moves diagonally across the runner blades. The chamber 34 extends cylindrically around the tips of runner blades. The conical hub 30 mounts to a head cover 36. The shaft 38 connects to the hub 30, extends through the head cover and connects to an electrical generator.

FIG. 3 illustrates another exemplary conventional water turbine 40. The propeller type runner blades 42 and hub 44 are formed as an integral metal casting. The water turbine 40 is an axial type turbine and is arranged in a chamber in a similar the chamber 12 for the water turbine 26 shown in FIG. 2.

The water turbines shown in FIGS. 1 to 3 illustrate conventional connections between the runner blades and hubs. As shown in these figures, runner blades may be integrally cast with the hub, welded to the hub, attached by shrink rings to the hub, or bolted to the hub. Integral casting, welding and in some applications of shrink rings are manufacturing and assembly steps applied at the manufacturing location for the water turbine. The water turbine is shipped with the blades attached to the hub to the dam where the turbine is to be installed. A difficulty arises when the water turbine is too large to be shipped from the manufacturing location to the water dam or other location at which the water turbine is to be installed.

An advantage offered by bolting the runner blades to the hub is that one or more of the blades may be attached to the hub at the water dam or other turbine installation location. Shipping the turbine hub by itself or with fewer than all of its runner blades reduces shipping costs and difficulties. Bolting the runner blades to the hub at the installation location saves transportation costs and reduces the difficulties associated with shipping a large water turbine. Similar to bolting the blades to the hub, the runner blades may be welded to the hub or secured with shrink rings at the installation location. Bolting, applying shrink rings and welding runner blades to hubs share the advantage of reducing the costs and difficulties of transporting water turbines.

SUMMARY OF INVENTION

A runner blade mounting system has been conceived for attaching runner blades, especially propeller type blades, to a hub. The runner blades may include a long, narrow base that seats against mounting surfaces recessed in the side of a conical hub. The base of the runner blades have mounting surfaces that are stepped and shaped to abut against the mounting surfaces in the hub.

The stepped mounting surfaces allow the base to conform to the inward taper of the hub. Each step shifts one or more of the mounting surfaces radially inward along a downstream direction. Similarly, the mounting surfaces in the hub step radially inward in the downstream direction. Because the steps shift the mounting surfaces radially inwardly with the taper of the hub, the mounting surfaces may extend further along the hub than do conventional mounting surfaces that do not step inwardly.

The mounting system with stepped mounting surfaces may be used for various types of water turbines, including axial and diagonal propeller style runner blades and other turbines having fixed blades. The mounting system is particularly beneficial for diagonal turbines and where there is a desire to reduce the ratio of the throat to the hub (T/H).

Adding stepped mounting surfaces to a tapered hub increases the design freedom in arranging the runner blade and the pattern of mounting bolts that secure the runner blades to the hub. For example, the stepped mounting surfaces allow the base of a runner blade to be narrow and long such that it extends axially along all or nearly all the length of the hub. The stepped mounting surfaces also allow the base to better conform to a long blade root. The stepped mounting surface also allows for a relatively large area of surface contact between the base and the mounting surfaces recessed in the hub. A large surface contact area allows the bolt pattern to be optimized to sustain high load forces.

The stepped mounting surfaces may be used to design smaller diameter hubs for a water turbine. The hub may have a smaller diameter because the mounting stepped surfaces allow the base of the runner blade to be narrow and long which reduces the width of the mounting surfaces recessed in the hub. The hub may have a smaller diameter because the mounting recesses are relatively narrow and will fit on a small diameter hub.

Reducing the diameter of the hub may allow for a larger water passage through the throat. Conventional hubs tend to have a large diameter to accommodate wide flange surfaces that support the base of runner blades.

The stepped mounting system may be used on new water turbine systems and in retrofits of an existing water turbine system. In addition to allowing for smaller hubs and optimized bolt patterns, the stepped mounting system assists in transporting the hub and runner blades to a dam for installation. One or more of the runner blades may be shipped separately from the hub to reduce the shipping difficulties that would otherwise occur in shipping a complete water turbine with all blades attached. The blades may be bolted to the hub at the dam during the installation of the water turbine in the dam.

The mechanical arrangement of mounting surfaces stepped along an axial direction provides greater freedom in designing the shape of the runner blade and the pattern of bolts that secure the base of the blade to the hub. For example, the arrangement of stepped mounting surfaces allows for longer bases for runner blades and narrower hubs. Decreasing the diameter of the hub reduces the ratio of hub diameter to throat diameter which increases the cross-sectional area of the water flow passage without changing the throat diameter.

An increase in the cross-sectional area of the water flow passage substantially increases the water flow rates through the water flow passage. An increase in the water flow rate provides a corresponding increase in the power generated by a water turbine. Moreover, the throat diameter is typically fixed for existing water turbine installations and is proportional to the cost of a water turbine at a new installation. Increasing the cross-sectional area of the water flow passage without increasing the throat diameter yields a significant power increase by a water turbine without incurring the high costs associated with expanding the throat diameter.

The stepped mounting surfaces on the base of a runner blade may have a length dimension align with the hub axis which allows the length of the base to be substantially greater than its width. The stepped mounting surfaces also allow the base to mount to an inclined or tapered outer surface of the hub. Further, the stepped mounting surfaces provide design freedom in arranging the pattern of connecting bolts on the base of the runner blades. The pattern of bolts may be arranged to, for example, concentrate the bolts at the regions of the base subjected to high force loads.

A hydro turbine assembly has been conceived comprising: a hub configured to rotate about a center axis and configured to be mounted in a water passage, wherein the hub includes an upstream end, a downstream end and an outer surface between the upstream and downstream ends, and further wherein the hub includes at least three mounting recesses arranged in the outer surface and the mounting recess includes a first hub mounting surface and a second hub mounting surface, wherein the second hub mounting surface is downstream and radially inward of the first hub mounting surface, and at least three runner blades each having a base configured to seat in one of the mounting recess, wherein the base includes a first blade mounting surface adapted to abut the first hub mounting surface and a second blade mounting surface adapted to abut the second hub mounting surface. The at least three mounting recesses may be arranged symmetrically around the center axis.

The mounting recess in the hub may have a longitudinal axis parallel to the center axis. The first and second hub mounting surfaces may each form a run in a stair step pattern where a riser extends between each pair of mounting surfaces. The riser may be perpendicular to the center axis and to the first and second hub mounting surfaces. Further, the first and second hub mounting surfaces may be planar, as may be the first and second blade mounting surfaces.

The base of the runner blade may include a center key that seats in a key slot of a mounting recess in the hub. The key may be a post extending radially inward from the bottom of the base of the runner blade. The key is configured to seat in a key slot of the mounting recess in the base. The key slot may be adjacent to the first and second hub mounting surfaces of the runner blade.

A method has been conceived to install a replacement hydro turbine, the method comprising: removing an existing hydro turbine from a water passage; replacing a narrow hub having a narrower diameter than an existing hub for the existing hydro turbine, wherein the narrow hub includes an upstream end, a downstream end and an outer surface between the upstream and downstream ends, and the narrow hub includes at least three mounting recesses arranged in the outer surface wherein the mounting recess each include a first hub mounting surface and a second hub mounting surface, and the second hub mounting surface is downstream and radially inward of the first hub mounting surface; mounting three runner blades each to a corresponding one of the mounting recesses, wherein each of the runner blades comprises a base including a first blade mounting surface that abuts the first hub mounting surface and a second blade mounting surface that abuts the second hub mounting surface, and mounting the narrow hub with the mounted runner blades in the water passage.

DETAILED DESCRIPTION

Figure 1:
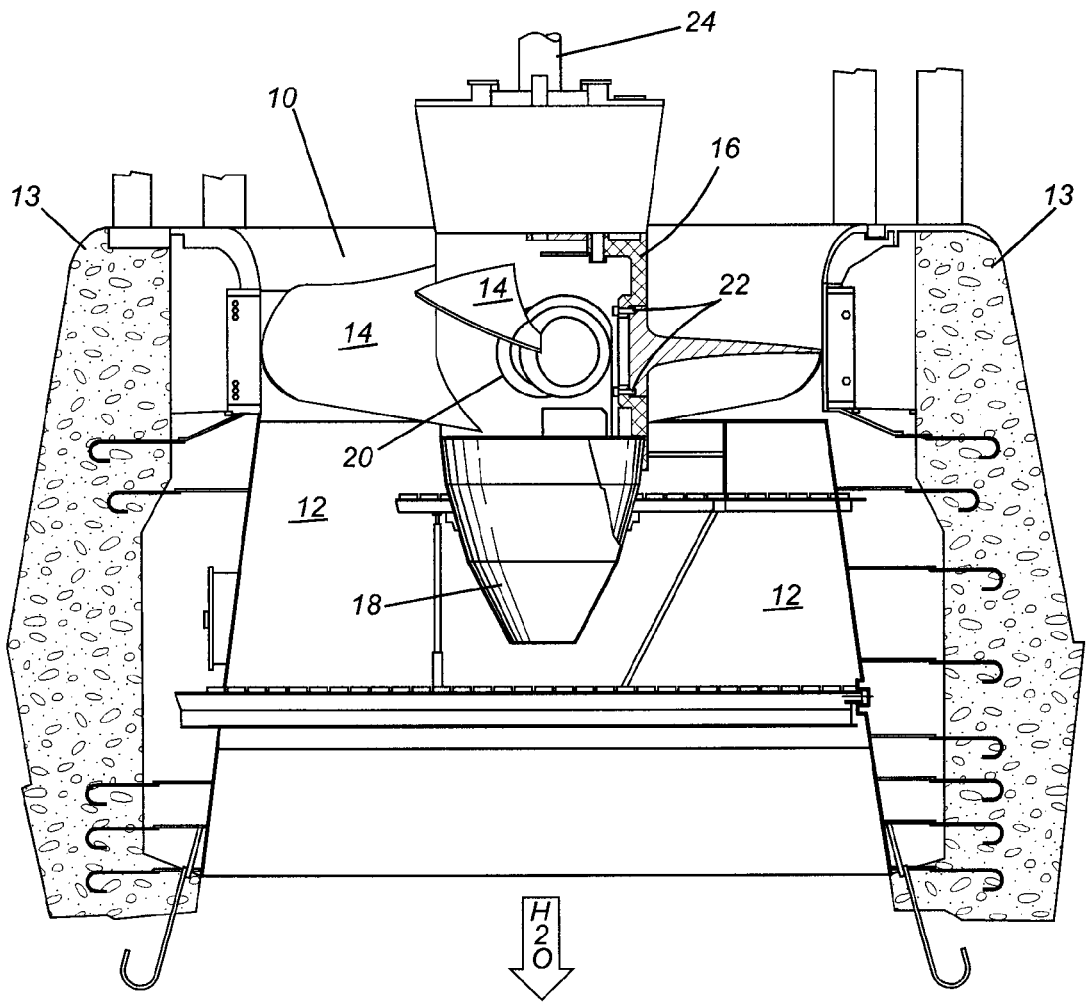
FIGS. 1 to 3 are side views, shown partially in cross-section, of conventional water turbines for hydro-electric power generation.
Figure 2:
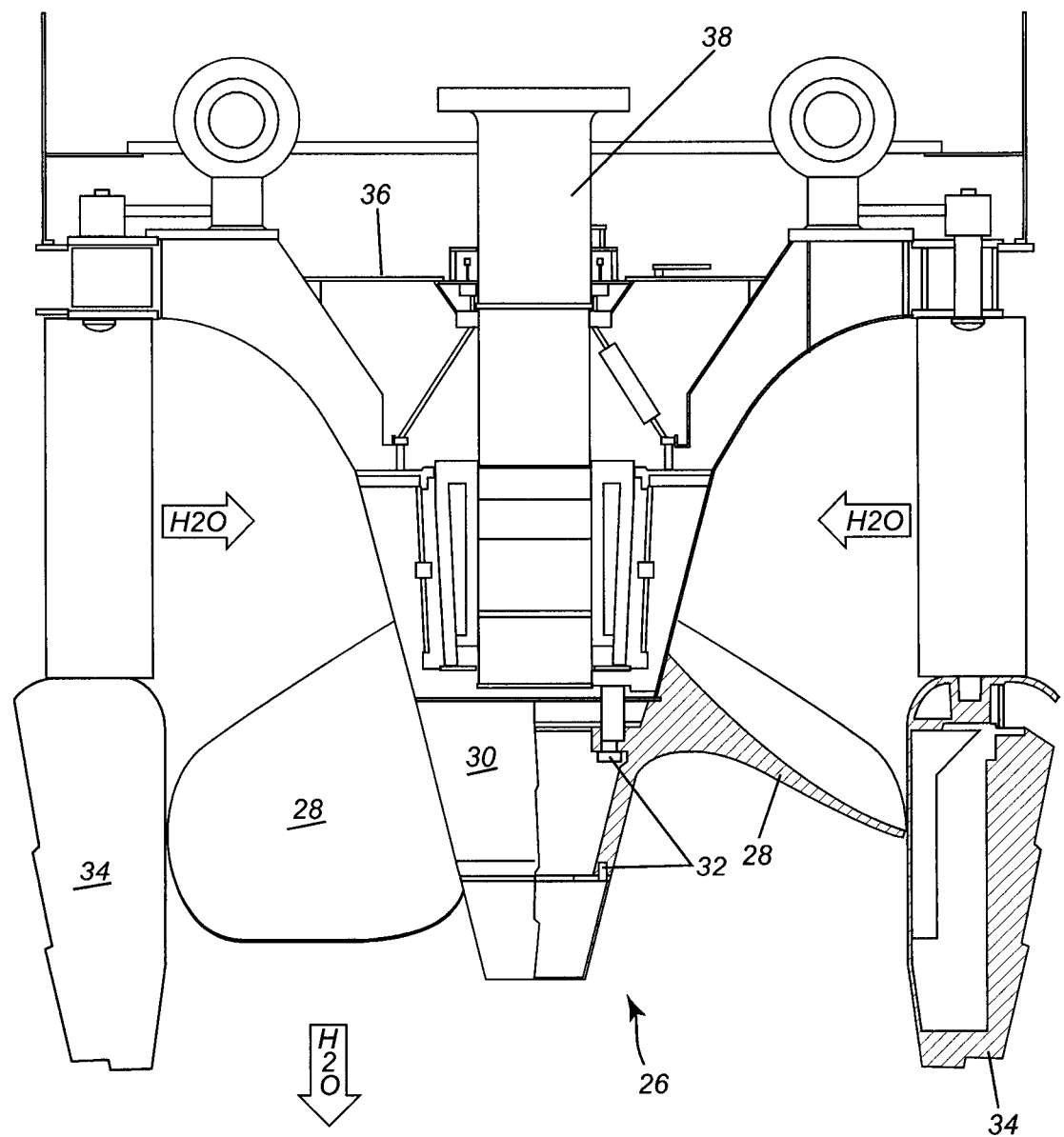
Figure 3:
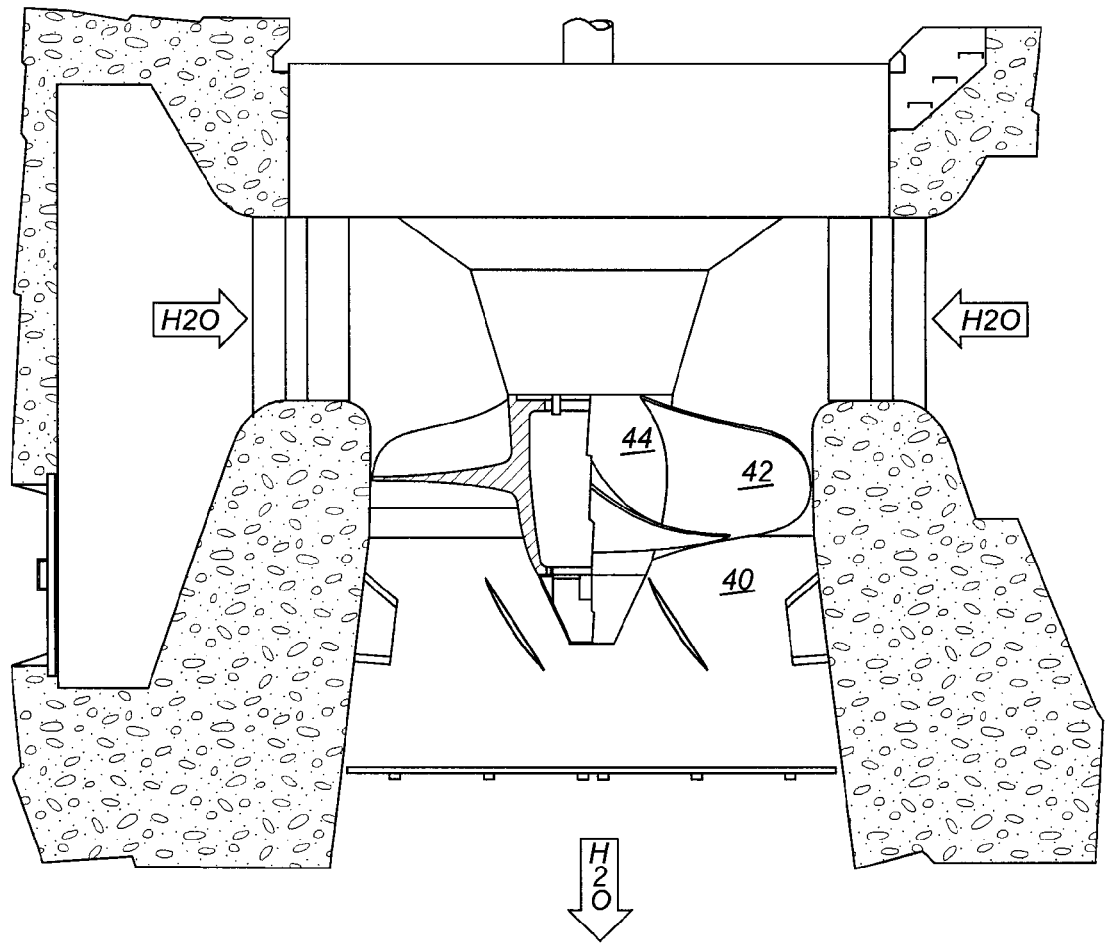
Figure 4:
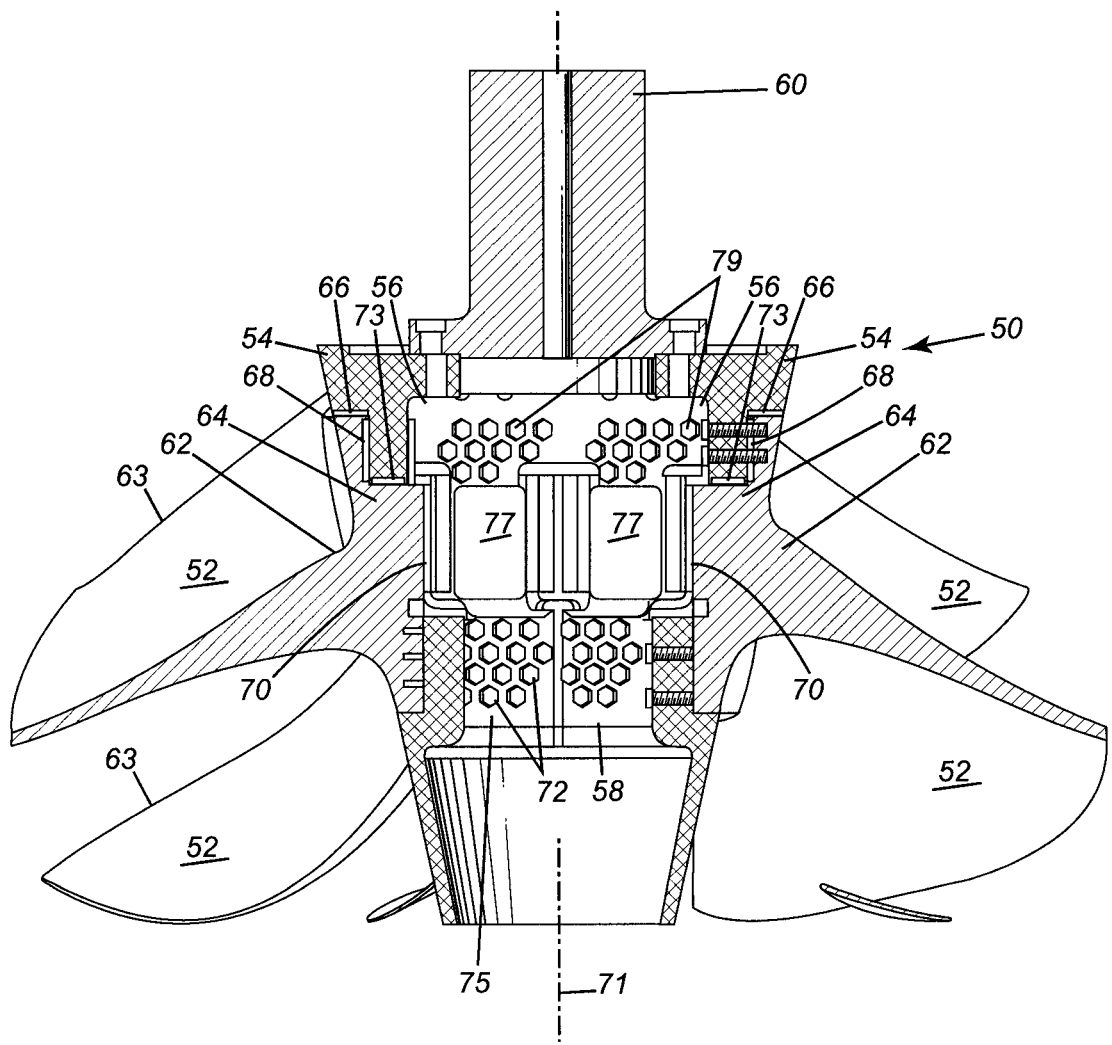
FIG. 4 is a side view, shown partially in cross-section of a water turbine having stepped mounting surfaces on the runner of blades and corresponding mounting surfaces in recesses in the hub.

FIG. 4 is a side view of a water turbine 50 in accordance with an embodiment of the present invention. In the embodiment depicted in FIG. 4, a portion of the runner blades 52 and hub 54 have been cut away to show the stepped mounting surfaces 56, 58 on the hub which receive similar mounting surfaces on the radially inner surface of the base of the runner blade. The hub is attached to a vertical shaft 60 which may drive the rotor of an electrical generator. The water turbine 50 is mounted in an annular chamber, such as shown in FIGS. 1 to 3, that may be in the wall of a dam.

The hub is not integral with the runner blades. As such, the runner blades may be attached, mounted, fastened or otherwise connected to the hub. The hub may be formed of a mild steel or other suitable material. The runner blades may be formed of a stainless steel or other material providing good corrosion protection and which can withstand cavitation from the water flowing over the runner blades. The hub and/or blades may optionally have a wear-resistant coating.

Each runner blade 52 has a base 64 and blade region 63, e.g., a propeller blade. The root 62 of each blade region 63 is integral with or attached to the base 64. The base 64 supports and attaches the runner blade to the hub 54. The base transfers the forces from the blade region 63 to the hub. These forces include torsion forces imparted by the water applied to the blades.

The base 64 has radially inwardly facing blade mounting surfaces 68, 70. These surfaces may be generally planar and parallel to the axis 71 of the hub 54. The mounting surfaces 68, 70 are stepped such that the upper mounting surface 68 is radially outward of the lower mounting surface 70. The radial position of each of the mounting surfaces is with respect to the axis 71 of the hub. The upper mounting surface is aligned with a portion of the hub 54 having a larger diameter than the diameter of the portion of the hub aligned with the lower mounting surface. A riser 73 of the base extends between the mounting surfaces 68, 70.

The mounting surface 68, 70 allow the base 64 of the runner blade to conform to the taper of the hub 54. By stepping the mounting surfaces radially inwardly in a downward direction, the base may be extended further along the length of the tapered hub. Without the steps in the mounting surfaces, the base would have a single mounting surface parallel to the shaft axis. A base having an entirely straight surface does not conform to a tapered hub and does not provide the design freedom to extend the base the length of the hub.

The base 64 with stepped mounting surfaces 68, 70 may extend more than half of the length of the hub, as is shown in FIG. 4. The length, width and shape of the base 64 are design parameters for the runner blade and hub. By stepping the mounting surfaces 68, 70, the range of lengths available for the base increases. The increase in available base lengths also allows for more freedom on the other design parameters such as the width and shape of the base, and the arrangement of bolt holes for the bolts connecting the base to the hub. For example, increasing the length of the base of the runner blade allows for a narrower base because the needed contact area can have a length much greater than its width.

The mounting surfaces 68, 70, in this embodiment, are parallel to the hub axis 71 due to the centrifugal forces acting radially on the hub and blades. The bolts 72 that secure the base to the hub extend radially such that the centrifugal forces primarily place the bolts under tension. Bending moments, shear and torsional forces are other forces applied to the bolts and the base. The bolts and surface area of the mounting surfaces should be sized sufficiently to withstand the bending, torsion and shear forces to be applied to the bolts and interface between the base and hub.

The blade mounting surfaces 68, 70 on the base seat on stepped hub mounting surfaces 56, 58 recessed into the hub. The hub mounting surfaces 56, 58 may be within a recess 66 in the hub, as is shown in FIG. 4. The hub may have a recess 66 corresponding to the base of each runner blade. Each recess 66 may have a perimeter conforming to the perimeter of the base 64 of the runner blade.

The hub mounting surfaces 56, 58 may have openings to receive the shaft of bolts or threaded rods 72 that extend radially out from the hub mounting surfaces and into the base of the runner blades. A bolt head or nut may be affixed to a radially inner end of the rod 72 shaft and secure the shaft to the inside surface of the hollow hub.

The hollow hub 54 may include a center chamber 75 aligned with the hub axis 71. The center chamber 75 is the hollow interior of the hub and provides access to insert the bolts 72 that secure the base of the runner blades to the hub. FIG. 4 shows the heads or nuts of the bolts 72 arranged on an inner sidewall of the center chamber 75. The inner side wall of the center chamber 75 may be stepped to conform to the steps 56, 58 in the recesses 66 on the outside surface of the hub. The corresponding steps on the inner sidewall of the center chamber 75 and in the recess 66 may be such that the thickness of the hub between the stepped mounting surfaces 56, 58 and the inner sidewall of the center chamber 75 remain substantially constant.

A key 77 on the base of each runner blade may protrude radially inward from the base into a key slot or hole 79 in the corresponding hub recess 66. The key 77 may have a cross sectional shape of rectangular, trapezoidal, racetrack, oval or other shape. The key slot or hole has a cross-sectional shape corresponding to the cross-sectional shape of the key 77. The key 77 seats in the key slot or hole 79 when the base of the runner blade is inserted into the recess 66 of the hub. The seating of the key 77 in the key slot or hole 79 provides support to the runner blade, especially support for the torsion loading of the runner blade due to the flow of water over the blade.

Shear pins (not shown) may be substituted for the key 77 or provide supplemental support to the support provided by the key 77. The shear pins may extend radially with respect to the axis 71 and seat in corresponding recesses in the base of the runner blade and the recess of the hub.

Figure 5:
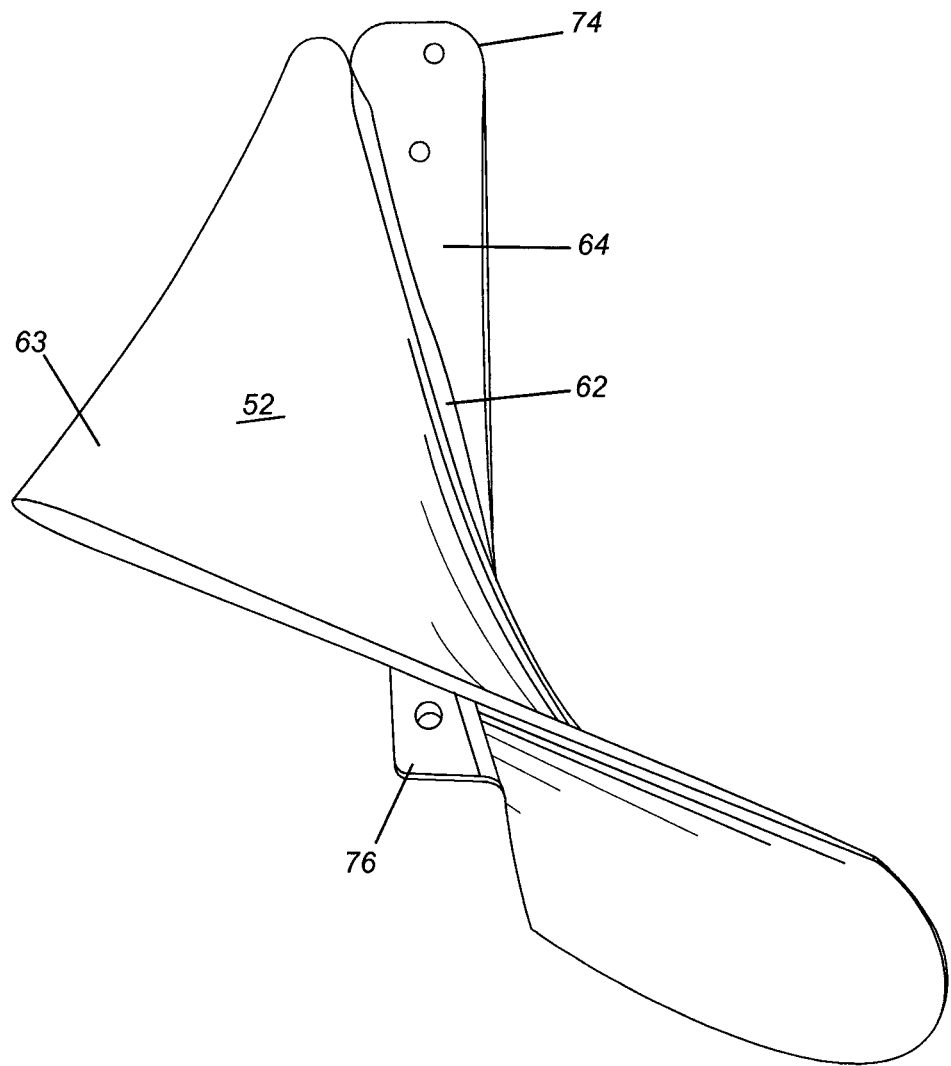
FIGS. 5 to 8 are perspective views of an exemplary runner blade having a base with stepped mounting surfaces.

FIG. 5 is a top down view of a runner blade 52 in which the tip portion of the blade portion has been removed and shown in cross-section to better illustrate the root 62 and base 64. The root 62 of the blade portion is affixed to an upper surface of the base 64, such as by welding, casting or bolts. The root 62 may extend substantially the entire length of the base. The root and blade portion may be askew on the base, as is shown by way of example in FIG. 5. The front edge of the blade portion may be offset to the left side, for example, of the base and the trailing edge may be offset to the right side of the base.

The base 64 of the runner blade may be generally rectangular or trapezoidal as shown in FIG. 5. The upper corners 74 of the base may be rounded while the lower corner 76 may have a relatively sharp ninety degree corner.

Figure 6:
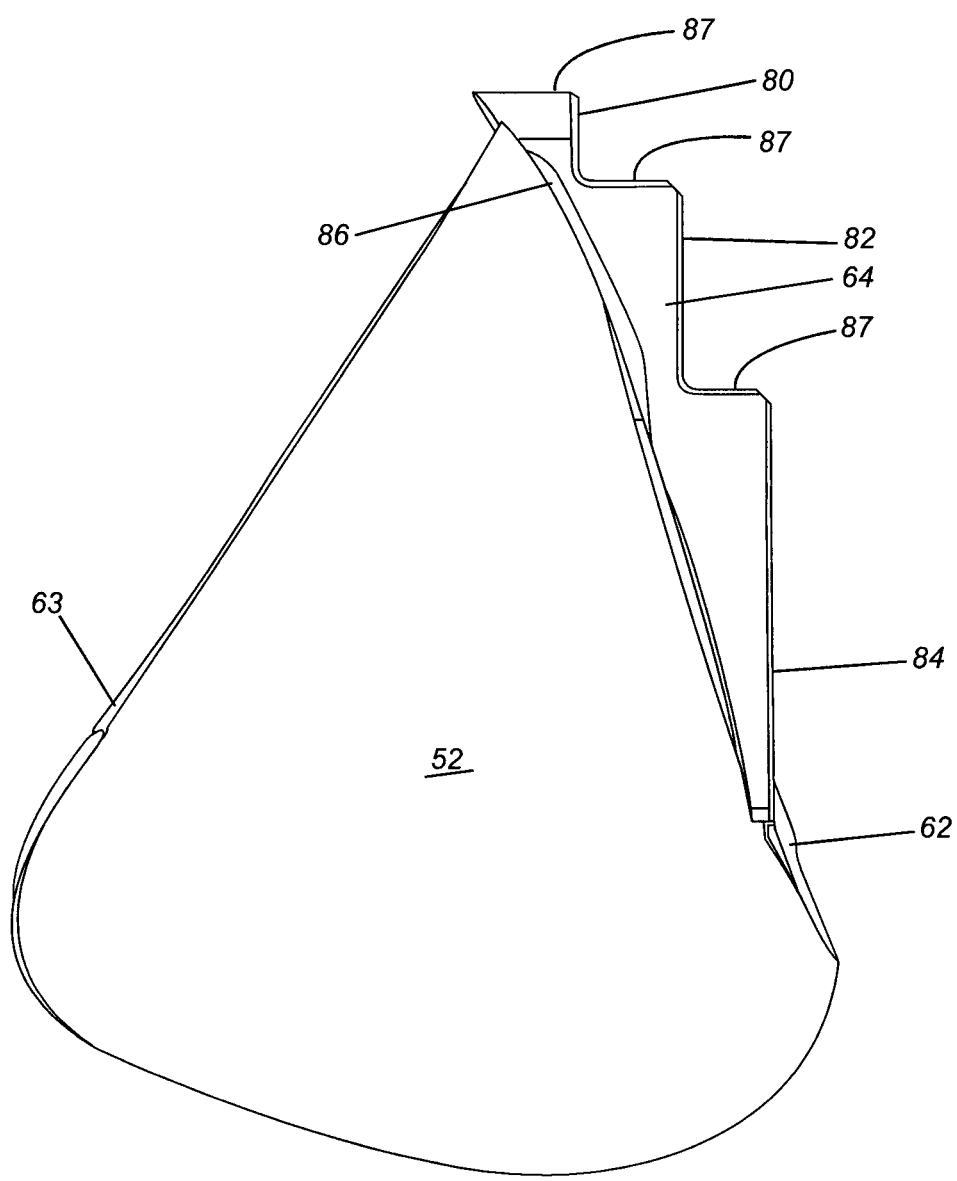

FIG. 6 is a side view of the runner blade 52. The upper surface 86 of base 64 may be inclined to conform to a taper of the hub. The thickness of the base, in a radial direction, varies with the steps formed by the three mounting surfaces 80, 82, 84. As shown in FIG. 6, the trailing edge of the blade portion 63 may extend beyond the lower end of the base 64.

The mounting surfaces 80, 82 and 84 may have irregular lengths, and the lengths of each surface may be based on a design selection made in determining the mounting of the runner blades to the hub. The risers 87 at the leading edge of each mounting surface 80, 82 and 84 may have a radial length selected during the design of the mounts for the blades to the hub. The risers may be planar and conform to corresponding risers in the recesses of the hub.

Figure 7:
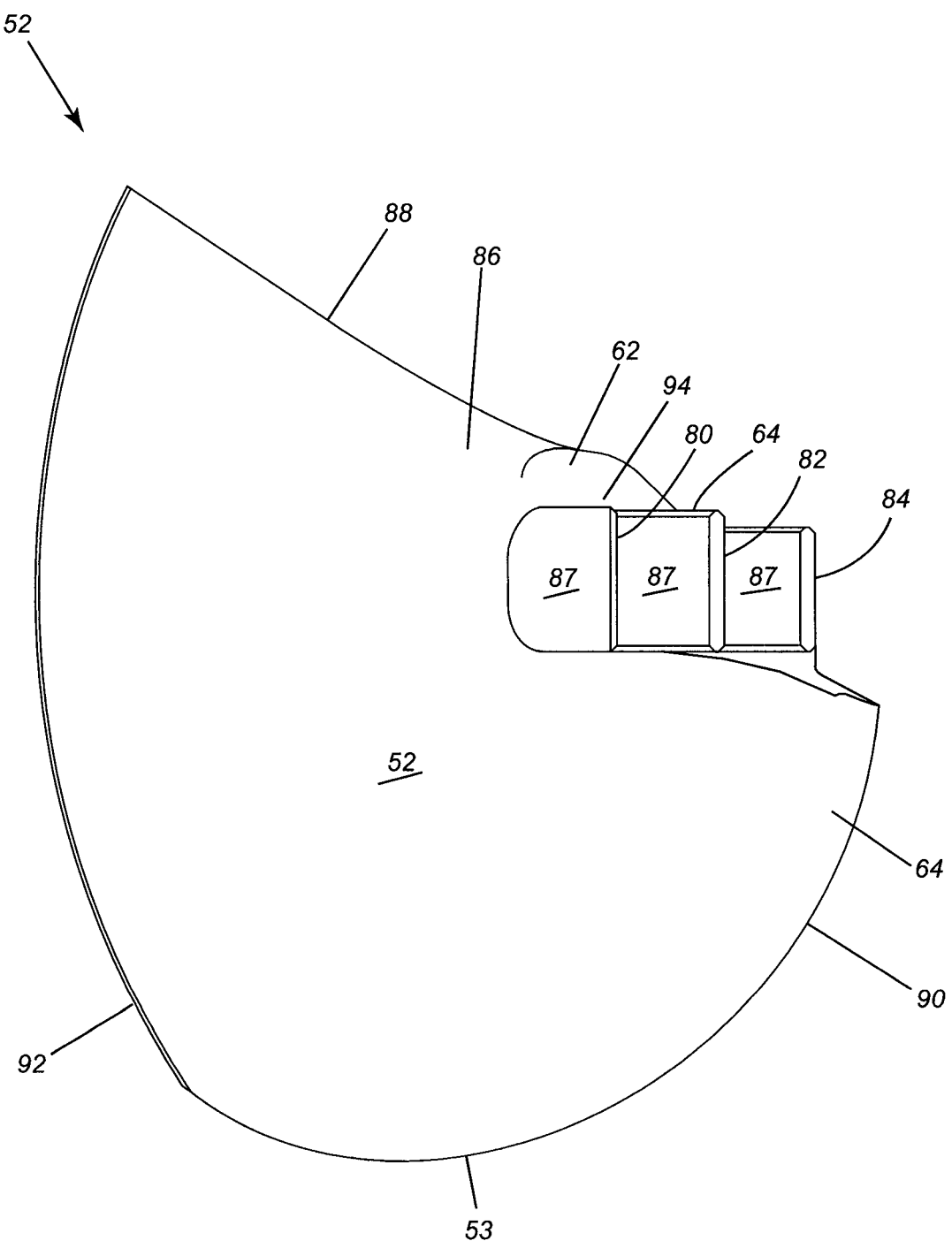

FIG. 7 is a view of the leading edge 88 of the blade portion 53 of the runner blade 52. The blade portion includes a trailing edge 90 and a tip 92. The base 64 is attached to the root 82 of the blade portion. A fillet 94 may extend along the outer edge of the joint between the base and root. The base may be welded or otherwise attached to the root of the blade. The root 62 may extend diagonally across the upper surface 86 of the base. A portion of the bottom of the root 62 may extend beyond the upper surface of the base.

The mounting surfaces 80, 82 and 84 may be parallel with each other and parallel to a longitudinal axis of the hub. The mounting steps may not be aligned with a surface of the blade portion. The mounting surfaces 80, 82 and 84 are shown as steps with risers 87 between each surface. Alternatively, the mounting surfaces may be inclined with respect to the axis of the hub, such as a single surface generally parallel to the taper of the hub.

Figure 8:
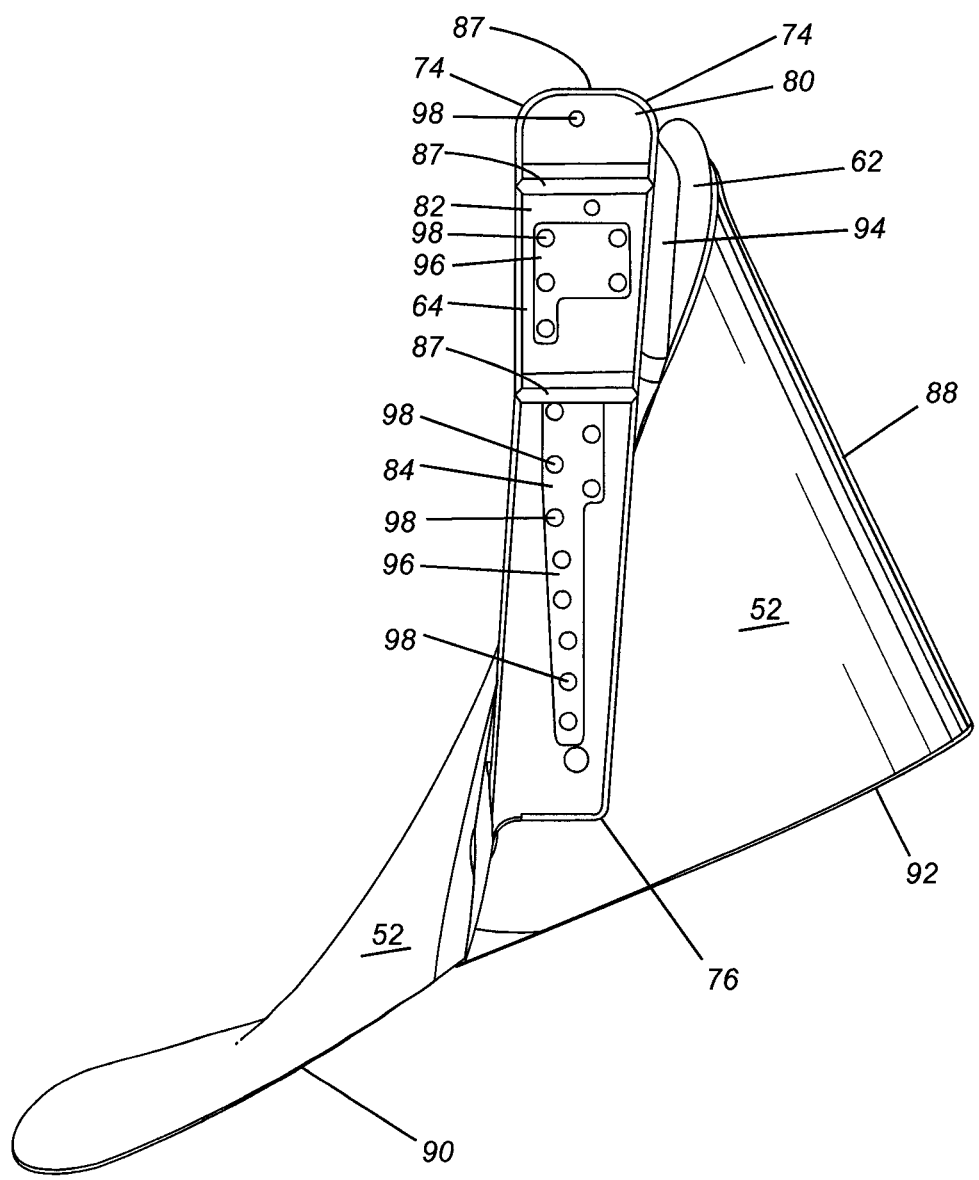

FIG. 8 is a bottom view of the runner blade 52 which shows the radially inward surfaces of the base 64 and root 62. The mounting surfaces 80, 82 and 84 are shown as having perimeters with rectangular shapes. The shapes of the perimeters of the mounting may have other shapes, such as convex or concaved, curved or triangular, provided that the shape of the mounting surface or surfaces mates with the opposing mounting surfaces on the hub. The mounting surfaces 80, 82 and 84 may have embedded plates or flanges 96 each having one or more openings 98 for the bolts that secure the blade 52 to the hub.

Figure 9:
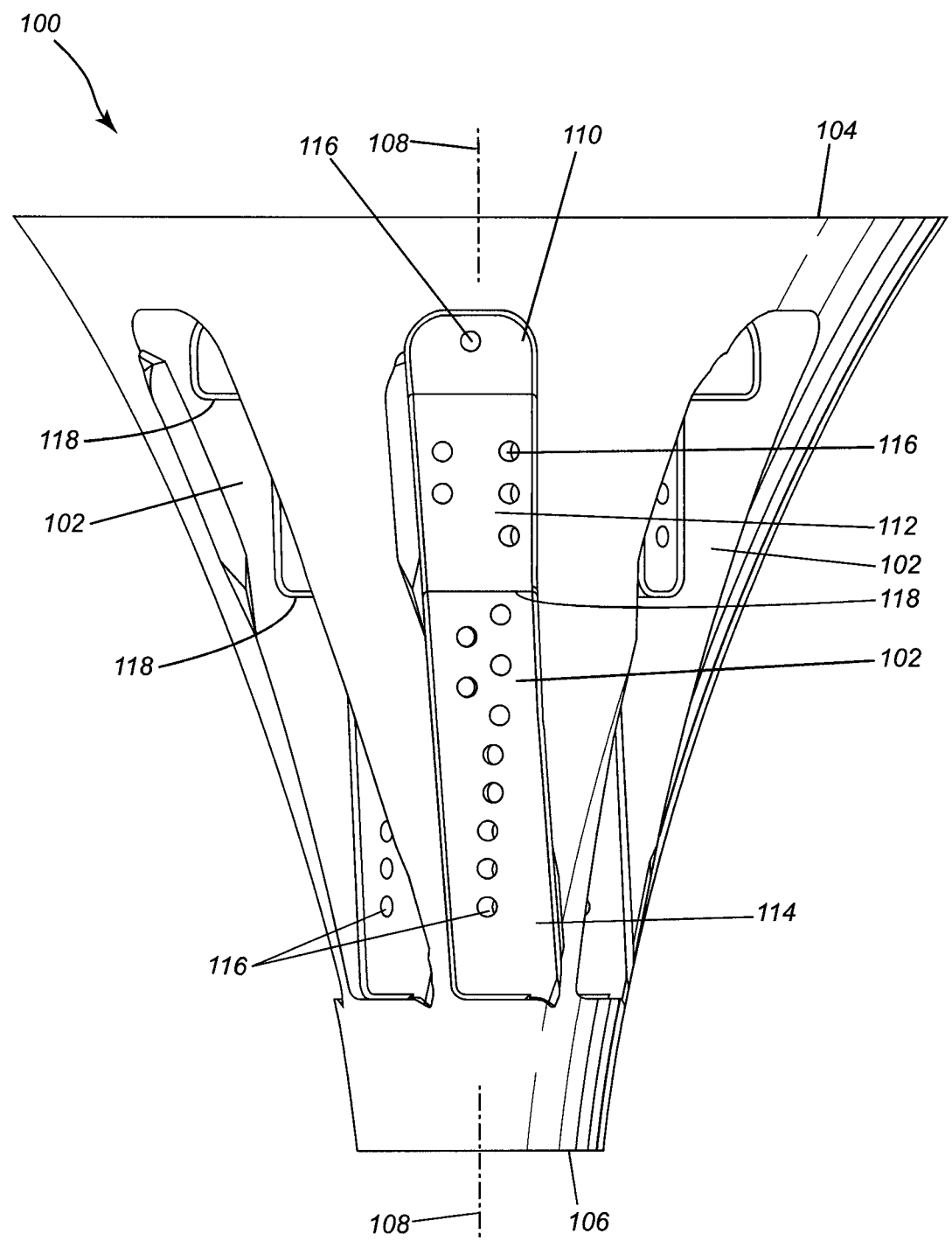
FIG. 9 is a perspective view of an exemplary hub having recesses with stepped mounting surfaces to receive the mounting surfaces of the base of the blade shown in FIGS. 5 to 8.

FIG. 9 is a side view of another embodiment of a tapered hub 100 with recesses 102 to receive runner blades. The hub has a large diameter upstream end 104 and a narrow diameter downstream end 106. The hub may be circular in cross-section, except for the recesses. The hub may be hollow. The taper of the conical hub may be linear, convex, concave or other suitable shape. The taper of the hub may conform to the taper of the annular chamber for the turbine in the wall of the dam. The recesses 102 may extend a majority of the length of the hub, such as more than half the hub length, more than three quarters the hub length and more than four fifths of the hub length. A trailing cone is not illustrated and may be attached, e.g., welded or bolted, to the downstream end 106 of the hub.

The recesses 102 in the hub may be aligned with, e.g., parallel to, the longitudinal axis 108 of the hub 100. The number of recesses may conform to the number of runner blades to be attached to the hub. The cross-sectional shape of each recess 102 may conform to the cross-sectional shape of the perimeter of the base of each runner blade.

Each recess 102 in the hub has a cross-section which conforms generally to the cross-section of the base of a runner blade. The recesses may each have the same cross-sectional shape and internal geometry. Alternatively, the recesses may each have a different cross-sectional shape or internal geometry to conform to variations in the bases of the runner blades. For example, each recess may have a cross-sectional shape which conforms to only one of the bases. These variations in the shape of the recess may be used to ensure that each runner blade is fitted to the proper recess.

The hub mounting surfaces 110, 112 and 114 in each recess 102 conform to the blade mounting surfaces on the base. The hub mounting surfaces may be planar and parallel to the axis 108 of the hub. The hub mounting surfaces 110, 112 and 114 have holes 116 through which extend the shafts of bolts which secure the runner blades to the hub. The hub mounting surfaces are stepped in an opposing manner to the steps of the mounting surfaces on the runner blades. The hub mounting surfaces abut against the blade mounting surfaces to provide a secure and rigid support by the hub for the runner blade. Bolts extending through the holes 116 bias the hub mounting surfaces against the mounting surfaces of the blades.

The stepping of the hub mounting surfaces 110, 112 and 14 allows the mounting surfaces to extend much of the length of the tapered hub. As the diameter of the hub decreases, each successive hub mounting surface is stepped radially inwardly. The risers 118 between the hub mounting surfaces and the length of each mounting surface may be selected based on the taper of the hub.

Figure 10:
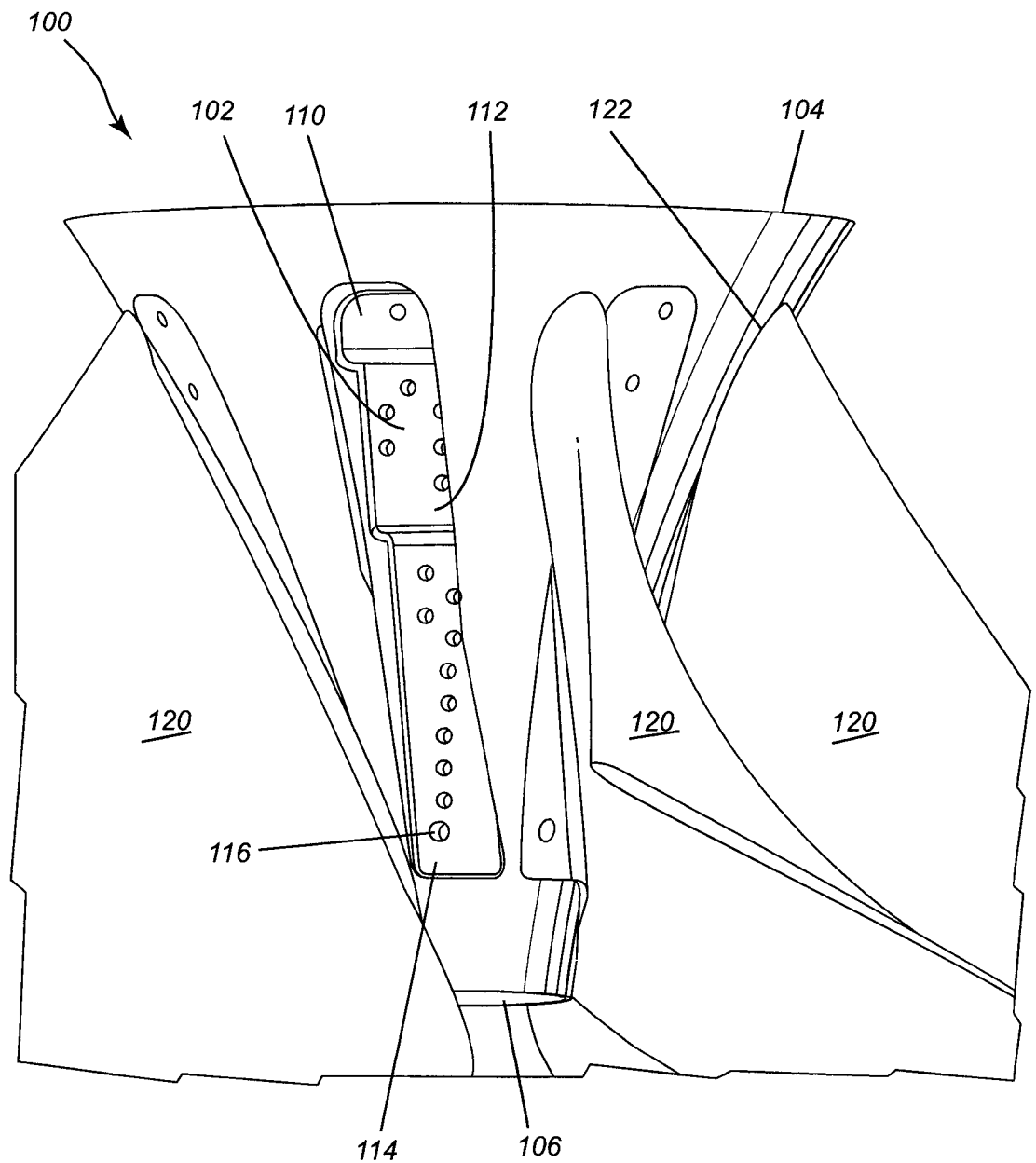
FIGS. 10 to 12 are views of a runner blade and hub assembly, shown partially in cross-section.

FIG. 10 shows runner blades 120 attached to a hub 100. One of the recesses 102 in the hub is left open for purposes of illustration. The other hub recesses are shown as seating the bases 122 of their respective runner blades 120. FIG. 10 illustrates that the leading portion of the root a blade portion of a runner blade may extend outside of the base and over the surface of the hub. The lower portion of the root extends outside of the base and conforms to the outer surface of the hub. The lower surface of the root of the blade portion may abut against the outer surface of the hub.

Figure 11:
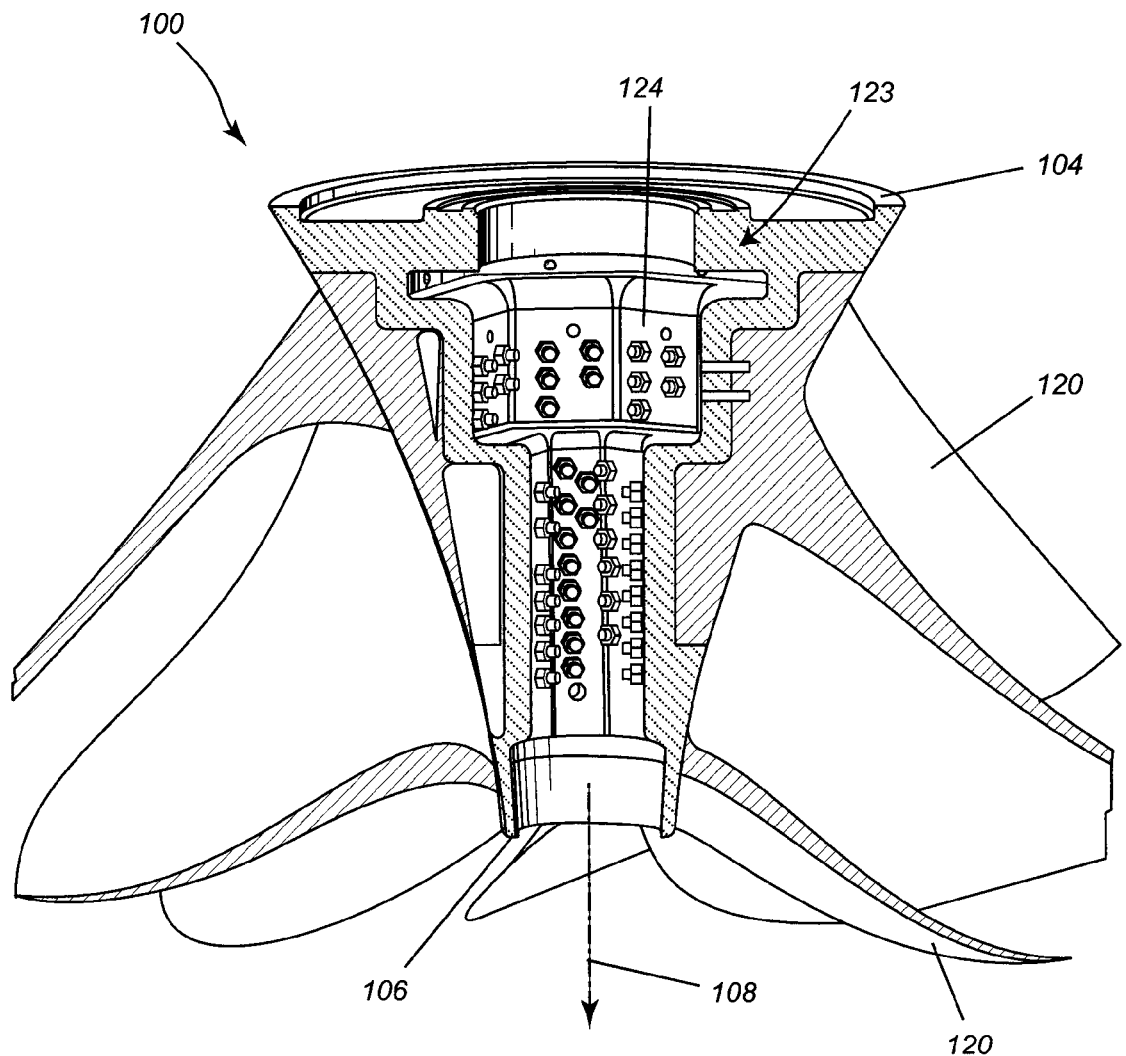

FIG. 11 is a side and cross-sectional view of the hub 100 and runner blades 120. The figure shows a portion of the hub in cross-section to illustrate its hollow interior 123 which includes planar interior sidewalls 124 opposite the to the hub mounting surfaces shown in FIGS. 9 and 10. The interior sidewalls 124 may be stepped in a manner similar to the steps of the hub mounting surfaces. The interior sidewalls may also be parallel to the axis 108 of the hub. Alternatively the interior sidewalls may be tapered in a manner similar to the taper of the hub, especially if the hub mounting are taped.

Figure 12:
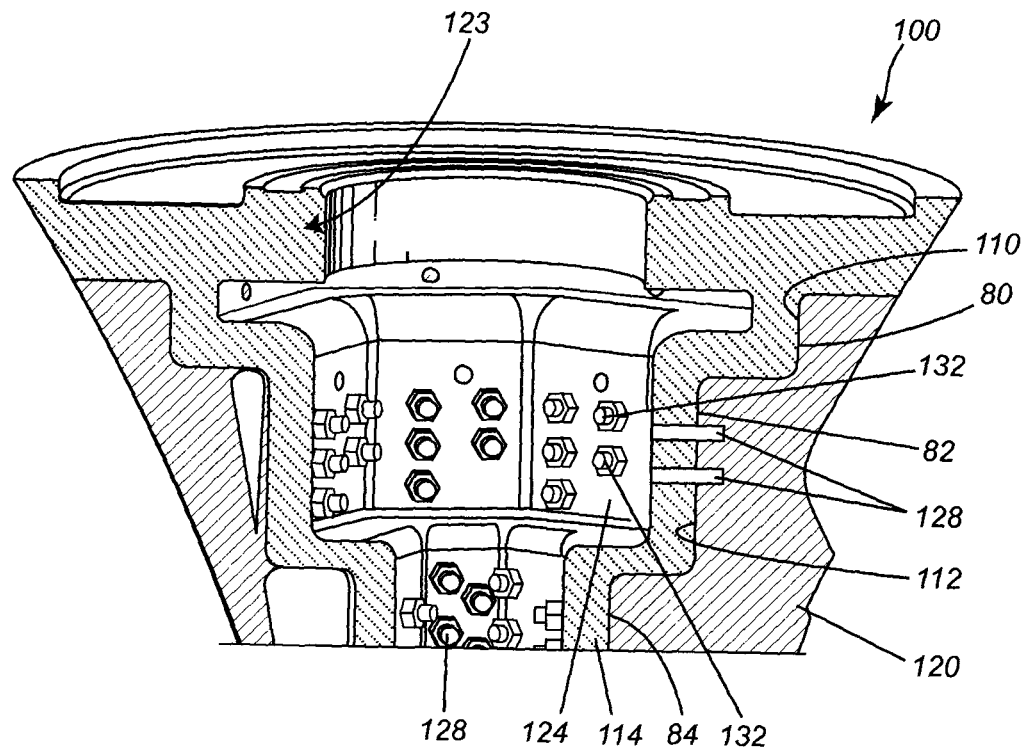

FIG. 12 is an enlarged cross-sectional view of an upper region of the assembly of the hub 100 and runner blades 120. The interior sidewalls 124 have holes through which extend the threaded shafts 128 from the base of the runner blades. The threaded shafts are seated in threaded holes extending radially into the base of the runner blades. The shafts extend from the base into the hub and protrude through the interior sidewalls 124 of the interior 123 of the hub. Nuts or other fasteners 132 are attached to the ends of the shafts to secure the runner blade to the hub.

The mounting surfaces 80, 82 and 84 on the base of the runner blade seat, e.g., abut against, the hub mounting surfaces 110, 112 and 114 of the hub 100. The threaded shafts 128 and fasteners 132 bias the mounting surfaces of the base against the hub mounting surfaces.

Figure 13:
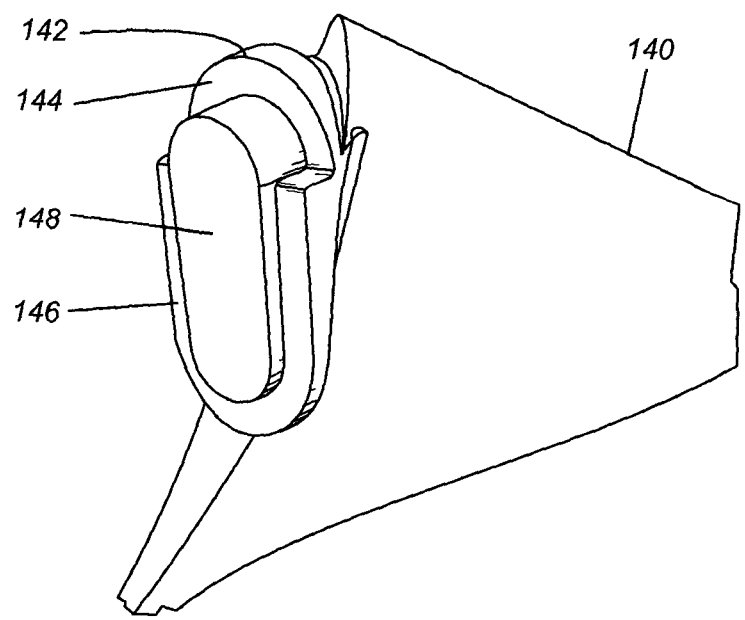
FIG. 13 is a perspective view of a portion of a water runner blade having an alternative base design.

FIG. 13 shows a perspective view of the side of a runner blade 140 having an alternative base 142 with stepped mounting surfaces 144, 146. The mounting surfaces 144, 146 are arranged around the perimeter of a center key 148 that extends radially inwardly from the base. The key 148 may be a raised section of the base having a racetrack cross-section. The mounting surfaces 144, 146 may be U-shaped sections that extend around the key.

Figure 14:
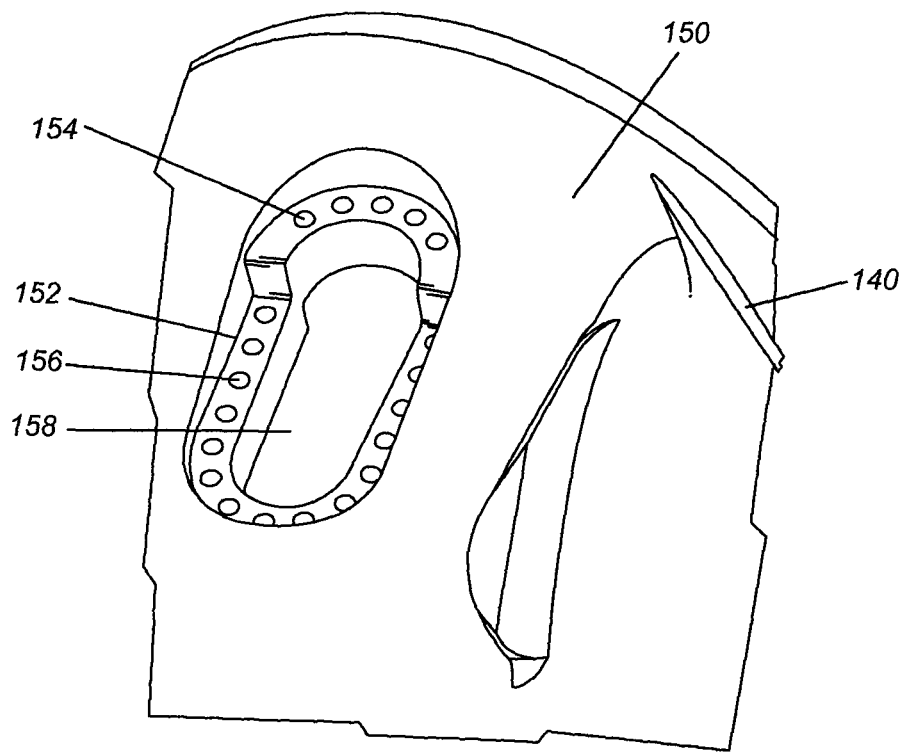
FIG. 14 is a perspective view of a portion of a hub with a mounting recess to receive the alternative base of the blade shown n FIG. 13.

FIG. 14 is a perspective view of a portion of a hub 150 which receives the runner blade 140 having the base with a key. The hub 150 includes recesses 152 with hub mounting surfaces 154, 156 which receive the mounting surfaces 144, 146 of the base of the runner blade. The recess includes an opening 158 or a deep recess in the hub to receive the key of the base. The opening or deep recess is shaped to conform to the sidewall of the key and thereby prevent rotation of the runner blade with respect to the hub.

Figure 15:
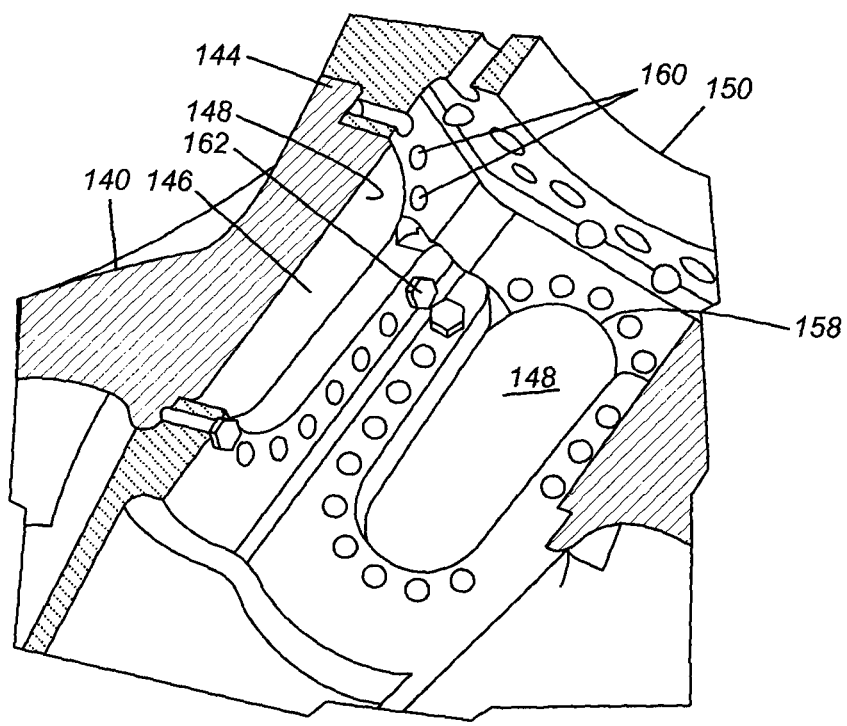
FIG. 15 is a perspective view of the hollow interior of a blade and hub assembly, shown partially in cross section.

FIG. 15 is a cross-sectional view of the hollow interior of the hub 150 which illustrates the key 148 of a runner blade 140 seated in the deep recess or opening 158 of the hub. The fastener holes 160 in the sidewalls of the hub allow shafts and nut assemblies 162 to secure the runner blades to the hub.

Figure 16:
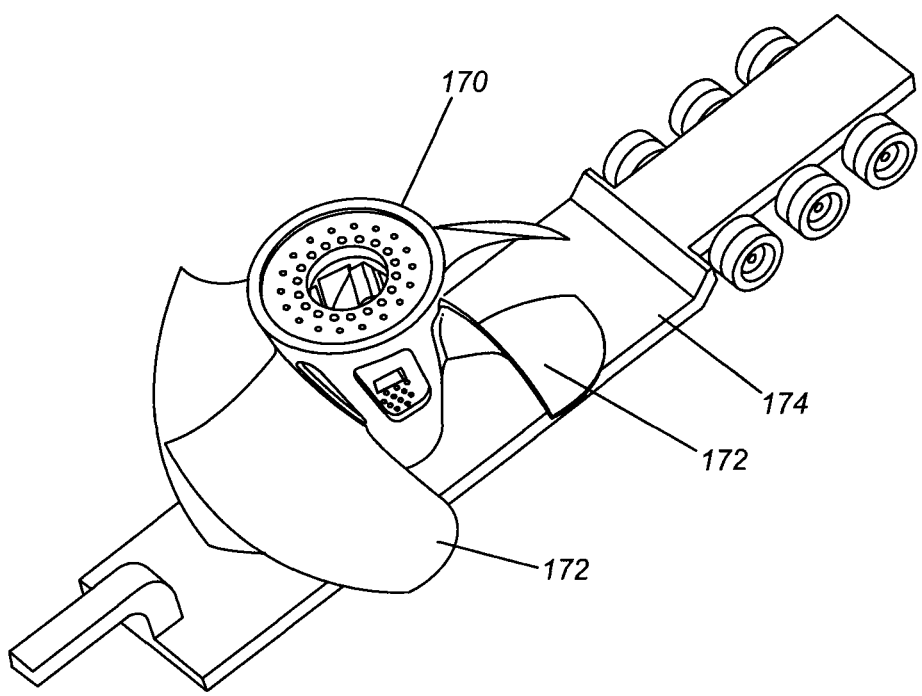
FIG. 16 is a perspective view of a hub and blade assembly being transported on a flatbed trailer to be hitched to a truck or other motorized vehicle.

FIG. 16 illustrates a hub 170 with some but not all runner blades 172 attached to the hub 170. Because not all of the runner blades are attached, the hub and turbine assembly may be mounted on and transported by a flatbed of truck trailer 174. The remaining runner blades may be separately transported to the dam and attached to the hub at the dam.

While threaded shafts and nuts have been shown to secure the blade to the hub, the base of the runner blade may be welded or otherwise fastened to the hub without use of threaded shafts and nuts.

The number, size and shape of the runner blades on a hub are dependent on the hydraulic design of the turbine. The number of runner blades is at least three for all of the embodiments disclosed herein. The blades may be arranged to extract the maximum of energy from the water flow that passes through the turbine. The force loads resulting from the water flow and extracting energy by the turbine are transmitted by the runner blades, through the base to the hub. The contributors to the load are gravity which applies a downward force on the base and hub due to the weight of the runner blades. Another force contributor is due to the water pressure difference between the upstream and downstream portions of the turbine. During operation of the turbine, the water flow applies a tangential force to the runner blades which is transmitted through the base to the hub. In addition, a rotational force, e.g., centrifugal force, arises due to the rotation of the runner blades and hub. The designer of the runner blade will take these forces into account in designing the runner blades and hubs.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims.

What is claimed is:

1. A hydro turbine assembly comprising:
   a hub configured to rotate about a center axis and configured to be mounted in a water passage, wherein the hub includes an upstream end, a downstream end, and an outer surface between the upstream end and the downstream end, the hub including at least three mounting recesses, wherein the mounting recesses each include a first hub mounting surface and a second hub mounting surface, and wherein the second hub mounting surface is downstream and radially inward from the first hub mounting surface, and
   at least three runner blades each including a base configured to seat in a respective one of the mounting recesses, wherein the base includes a first blade mounting surface configured to mechanically fasten the first hub mounting surface and a second blade mounting surface configured to mechanically fasten the second hub mounting surface, wherein a riser extends between the first hub mounting surface to the second hub mounting surface.

2. The hydro turbine assembly as in claim 1 further comprising a third hub mounting surface radially inward and downstream of the second hub mounting surface, wherein a second riser extends between the second hub mounting surface and the third hub mounting surface, and a third blade mounting surface is configured to mechanically fasten the third hub mounting surface.

3. The hydro turbine assembly as in claim 1 wherein the three mounting recesses each have a longitudinal axis parallel to the center axis and the first and second hub mounting surfaces are parallel to the center axis.

4. The hydro turbine assembly as in claim 1 wherein the riser is perpendicular to the center axis and the first and second hub mounting surfaces.

5. The hydro turbine assembly as in claim 1 wherein the first and second hub mounting surfaces are planar, and the first and second blade mounting surfaces are planar.

6. The hydro turbine assembly as in claim 1 wherein the base for each of the runner blades includes a key and each of the mounting recesses includes a key slot, wherein the key seats in the key slot when the base is seated in one of the mounting recess.

7. The hydro turbine assembly as in claim 6 wherein the key slot is a raised center region of the base and is adjacent the first and second hub mounting surfaces.

8. The hydro turbine assembly as in claim 1 wherein the base of each of the runner blades includes an upper surface affixed to a root of the runner blade, and the upper surface is oblique to each of the blade mounting surfaces.

9. The hydro turbine assembly as in claim 8 wherein the upper surface of the base is aligned with the outer surface of the hub while the base of the corresponding runner blade is seated in the mounting recess.

10. The hydro turbine assembly as in claim 1 wherein the at least three mounting recesses are symmetrically arranged on the hub around the center axis.

11. A method to install a replacement hydro turbine, the method comprising:
   removing an existing hydro turbine from a water passage;
   replacing an existing hub on the existing hydro turbine with a narrow hub having a narrower diameter than the existing hub, wherein the narrow hub includes an upstream end, a downstream end, and an outer surface between the upstream end and the downstream end, and the narrow hub includes at least three mounting recesses, wherein the mounting recess each include a first hub mounting surface and a second hub mounting surface, and the second hub mounting surface is disposed downstream and radially inward from the first hub mounting surface and wherein a riser extends between the first hub mounting surface to the second hub mounting surface;

mounting three runner blades each to a corresponding one of the mounting recesses, wherein each of the runner blades comprises a base including a first blade mounting surface configured to mechanically fasten the first hub mounting surface and a second blade mounting surface configured to mechanically fasten the second hub mounting surface, and placing the narrow hub having the mounted runner blades into the water passage.

12. The method of claim 11, wherein the water passage is defined by an annular housing having a fixed diameter, wherein the fixed diameter remains constant during the steps of removal, replacement, and placement, and wherein a flow passage area between the annular housing and the original hub is smaller than a flow passage area between the annular housing and the narrow hub.

13. The hydro turbine assembly as in claim 11, wherein the mounting recesses of the narrow hub each include a third hub mounting surface radially inward and downstream from the second hub mounting surface, wherein a second riser extends between the second hub mounting surface and the third hub mounting surface, and wherein the base of each of the runner blades includes a third blade mounting surface configured to mechanically fasten the third hub mounting surface.

14. The hydro turbine assembly as in claim 11, wherein the three mounting recesses each have a longitudinal axis disposed parallel to a vertical rotational axis of the narrow hub, and the first and second hub mounting surfaces are parallel to the vertical rotational axis.

15. The hydro turbine assembly as in claim 11 wherein at least one of the runner blades is mounted to the narrow hub at a location proximate to the water passage.

* * * * *